US012647541B2

(12) United States Patent
Wanta

(10) Patent No.: US 12,647,541 B2
(45) Date of Patent: Jun. 2, 2026

(54) SYSTEMS AND METHODS FOR PREVIEWING GOLF COURSES

(71) Applicant: Textron Inc., Providence, RI (US)

(72) Inventor: Brian David Wanta, North Augusta, SC (US)

(73) Assignee: TEXTRON INC., Providence, RI (US)

( * ) Notice: Subject to any disclaimer, the term of this patent is extended or adjusted under 35 U.S.C. 154(b) by 0 days.

(21) Appl. No.: 18/914,819

(22) Filed: Oct. 14, 2024

(65) Prior Publication Data

US 2026/0106952 A1    Apr. 16, 2026

(51) Int. Cl.
| | |
|---|---|
| *G06F 16/00* | (2019.01) |
| *A63B 71/02* | (2006.01) |
| *G01C 11/04* | (2006.01) |
| *G06F 16/587* | (2019.01) |
| *H04N 7/18* | (2006.01) |

(52) U.S. Cl.
CPC ............. *H04N 7/183* (2013.01); *A63B 71/02* (2013.01); *G01C 11/04* (2013.01); *G06F 16/587* (2019.01)

(58) Field of Classification Search
CPC ........ H04N 7/183; A63B 71/02; G01C 11/04; G06F 16/587
See application file for complete search history.

(56) References Cited

U.S. PATENT DOCUMENTS

| | | |
|---|---|---|
| 6,331,872 B1 | 12/2001 | Hyuga |
| 7,100,190 B2 | 8/2006 | Johnson et al. |

| | | |
|---|---|---|
| 7,272,501 B2 | 9/2007 | Dorfman et al. |
| 7,872,593 B1 | 1/2011 | Rauscher et al. |
| 8,125,529 B2 | 2/2012 | Skoskiewicz et al. |
| 9,103,671 B1 | 8/2015 | Breed et al. |
| 10,048,384 B2 | 8/2018 | Griffiths et al. |
| 11,032,473 B2 | 6/2021 | Axson et al. |
| 11,644,830 B1 * | 5/2023 | Gate .................... G05D 1/0038 |
| | | 701/2 |
| 11,893,734 B1 * | 2/2024 | Nessim ................. G16H 50/20 |
| 2005/0037872 A1 | 2/2005 | Fredlund et al. |
| 2006/0055775 A1 | 3/2006 | Nou |
| 2006/0075442 A1 | 4/2006 | Meadow et al. |
| 2007/0219654 A1 | 9/2007 | Frink et al. |
| 2010/0245582 A1 | 9/2010 | Harel |
| 2010/0309047 A1 | 12/2010 | Balardeta et al. |
| 2011/0182465 A1 | 7/2011 | Baker et al. |
| 2012/0071277 A1 | 3/2012 | Denton et al. |
| 2012/0115650 A1 | 5/2012 | Balardeta et al. |

(Continued)

*Primary Examiner* — Alexander Khong
(74) *Attorney, Agent, or Firm* — Foley & Lardner LLP

(57) ABSTRACT

A golf course previewing system includes a vehicle and one or more processing circuits. The vehicle includes a camera configured to generate image data corresponding to an environment surrounding the vehicle as the vehicle drives about a golf course and a telemetry sensor configured to facilitate acquiring telemetry data associated with the vehicle. The one or more processing circuits are configured to acquire the telemetry data and the image data, assign a location to the image data based on the telemetry data, provide the image data and the location to an image database, receive, from a user device, an image request associated with a first location, acquire, from the image database, first image data corresponding to the first location, and generate and provide, to the user device, a display interface corresponding to the first image data.

20 Claims, 8 Drawing Sheets

402 — Receive, from a user device, a request associated with a location

404 — Acquire, from an image database, image data corresponding to the location

406 — Acquire and/or determine, based on the location, site attribute data associated with the location 408 — Generate and provide, to the user device, a display interface corresponding to the image data and the site attribute data

(56)                References Cited

U.S. PATENT DOCUMENTS

| | | | |
|---|---|---|---|
| 2014/0136098 A1 | 5/2014 | Stroila et al. | |
| 2014/0143819 A1 | 5/2014 | Chu | |
| 2015/0084755 A1* | 3/2015 | Chen ........................ | B60R 1/27 |
| | | | 340/435 |
| 2016/0337573 A1 | 11/2016 | Chan | |
| 2017/0080319 A1* | 3/2017 | Bastawros .............. | G01S 19/19 |
| 2017/0280105 A1 | 9/2017 | Malik et al. | |
| 2020/0139216 A1 | 5/2020 | Lee et al. | |
| 2022/0083921 A1 | 3/2022 | Brkic et al. | |
| 2023/0075621 A1* | 3/2023 | Shinohara .............. | G11B 27/10 |
| 2023/0171314 A1* | 6/2023 | Onti Srinivasan .. | G06F 18/2431 |
| | | | 370/474 |
| 2024/0217546 A1* | 7/2024 | Joubert .............. | G01C 21/3841 |
| 2024/0262392 A1* | 8/2024 | Kan .................. | B60W 60/0027 |
| 2025/0315050 A1* | 10/2025 | Van Hout .............. | G05D 1/227 |

* cited by examiner

400

402

Receive, from a user device, a request associated with a location

404

Acquire, from an image database, image data corresponding to the location

406

Acquire and/or determine, based on the location, site attribute data associated with the location

408

Generate and provide, to the user device, a display interface corresponding to the image data and the site attribute data

SYSTEMS AND METHODS FOR PREVIEWING GOLF COURSES

BACKGROUND

An experienced golfer may plan ahead for a round of golf at a golf course. However, such golfer may not have access to a system that allows for the golfer to visualize various locations around the golf course and/or access attributes associated with the various locations. The present application relates to golf course management systems, and more specifically to systems that allow for golfers to preview a golf course, with substantially real-time accuracy, in advance of a round of golf or to look ahead on the golf course during the round of golf.

SUMMARY

One embodiment relates to a golf course previewing system. The golf course previewing system includes a vehicle and one or more processing circuits. The vehicle includes a camera configured to generate image data corresponding to an environment surrounding the vehicle as the vehicle drives about a golf course and a telemetry sensor configured to facilitate acquiring telemetry data associated with the vehicle. The one or more processing circuits are configured to acquire the telemetry data and the image data, assign a location to the image data based on the telemetry data, provide the image data and the location to an image database, receive, from a user device, an image request associated with a first location, acquire, from the image database, first image data corresponding to the first location, and generate and provide, to the user device, a display interface corresponding to the first image data. The location corresponds to a position of the vehicle when the camera generated the image data.

Another embodiment relates to a golf course preview system. The control system includes an image database and one or more processing circuits. The one or more processing circuits are configured to receive, from a user device, an image request associated with a first location on the golf course, acquire, from the image database, first image data corresponding to the first location, and generate and provide, to the user device, a display interface corresponding to the first image data. The first image depicts a portion of the golf course from a perspective of a golfer positioned on the golf course.

Still another embodiment relates to a method for operating a golf course preview system. The method includes acquiring, from a vehicle, image data generated by the vehicle as the vehicle drives about the golf course and telemetry data associated with the vehicle, assigning a location to the image data based on the telemetry data, providing the image data and the location to an image database, receiving, from a user device, an image request associated with a first location, acquiring, from the image database, first image data corresponding to the first location, and generating and providing, to the user device, a display interface corresponding to the first image data. The location corresponds to a position of the vehicle when the vehicle generated the image data.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1A:
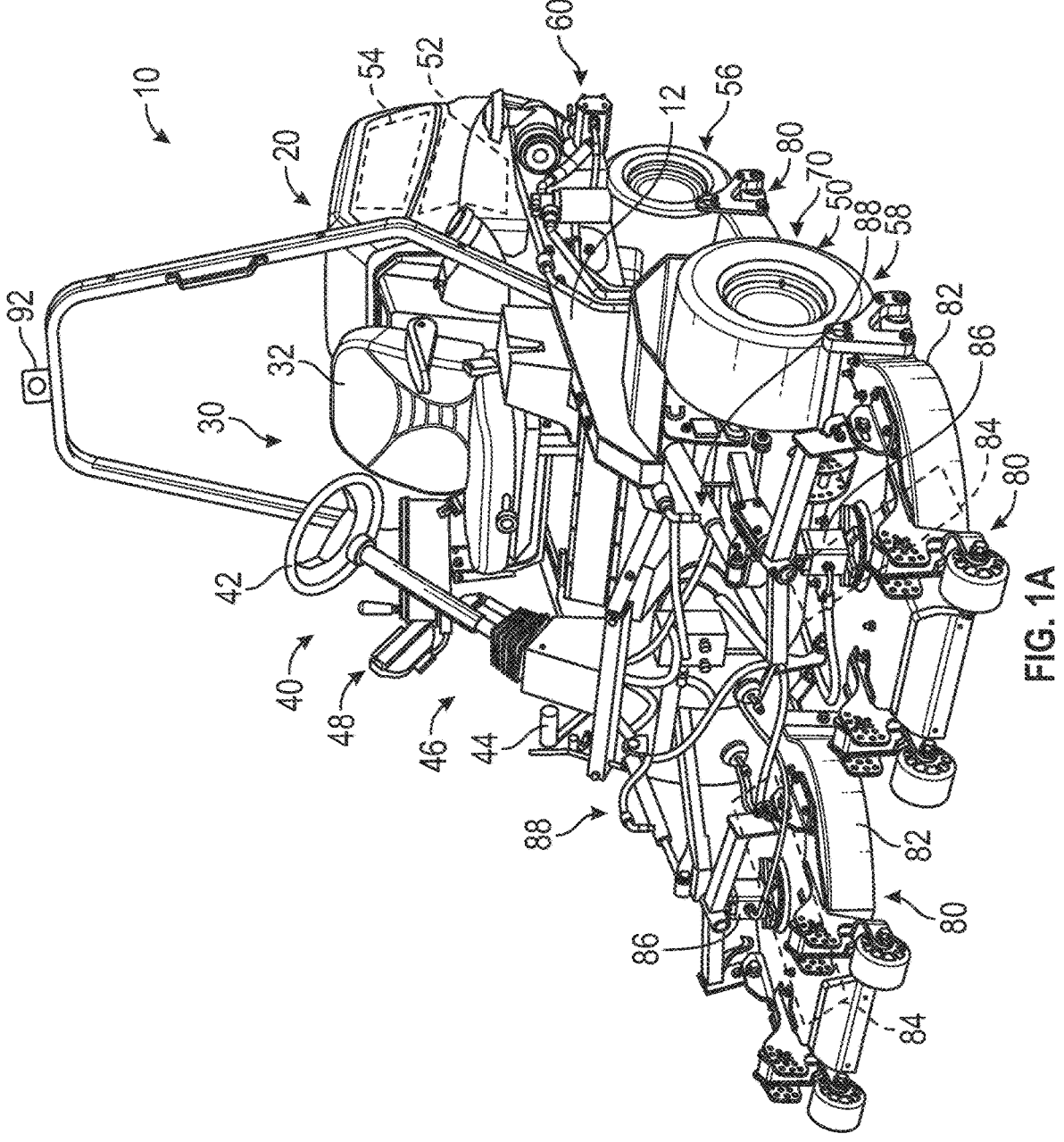
FIG. 1A is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

As shown in FIG. 1A-3, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; a series of implements, mower assemblies, or cutting units, shown as mower decks 80; one or more sensors, shown as sensors 90; and a vehicle control system, shown as vehicle controller 100, coupled to the operator controls 40, the driveline 50, the suspension system 60, the braking system 70, the mower decks 80, and the sensors 90. In other embodiments, the vehicle 10 includes more or fewer components. By way of example, the vehicle 10 may not include the mower decks 80 when the vehicle 10 is not configured as a mower.

Figure 1B:
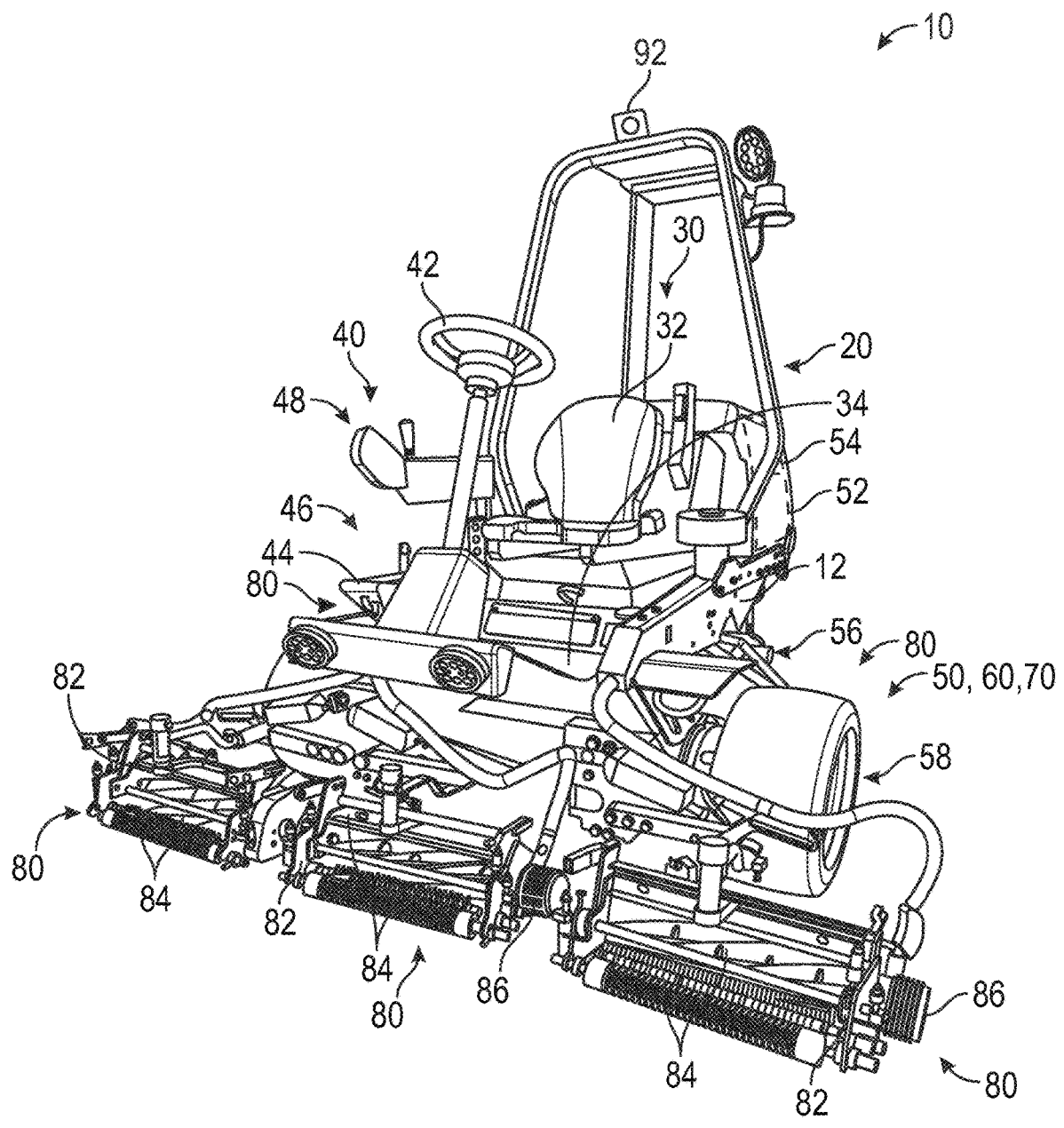
FIG. 1B is a perspective view of a vehicle, according to another exemplary embodiment.

According to an exemplary embodiment, the vehicle 10 is an off-road machine or vehicle. As shown in FIGS. 1A and 1B, the vehicle 10 is configured as a mower (e.g., a lawnmower, a turf mower, a push mower, a ride-on mower, a stand-on mower, or another type of mower). In other embodiments, the off-road machine or vehicle is a light-weight or recreational machine or vehicle such as a golf cart, golf cars, an all-terrain vehicle ("ATV"), a utility task vehicle ("UTV"), and/or another type of lightweight or recreational machine or vehicle. In some embodiments, the off-road machine or vehicle is a chore product such as aerator, turf sprayer, bunker rake, and/or another type of chore product (e.g., that may be used on a golf course). In other embodiments, the vehicle 10 is an unmanned machine or vehicle such as an autonomous machine or a drone.

According to the exemplary embodiments shown in FIGS. 1A and 1B, the occupant seating area 30 includes a single seat, shown as driver seat 32. In some embodiments, the occupant seating area 30 includes additional seats (e.g., a passenger seat, an additional row of seats, etc.). According to the exemplary embodiments shown in FIGS. 1A and 1B, the driver seat 32 is laterally centered on the body 20 and facing forward. In some embodiments, the driver seat 32 is facing rearward or otherwise positioned. In some embodiments, the occupant seating area 30 is omitted (e.g., the vehicle 10 is configured as a push mower). A portion of the frame 12 defines a platform, deck, or standing area, shown as operator platform 34. The operator platform 34 may extend forward of the driver seat 32 such that the occupant can rest their feet on the operator platform 34 while seated in the driver seat 32. The operator platform 34 may support the occupant as the occupant enters or exits the driver seat 32.

Figure 2:
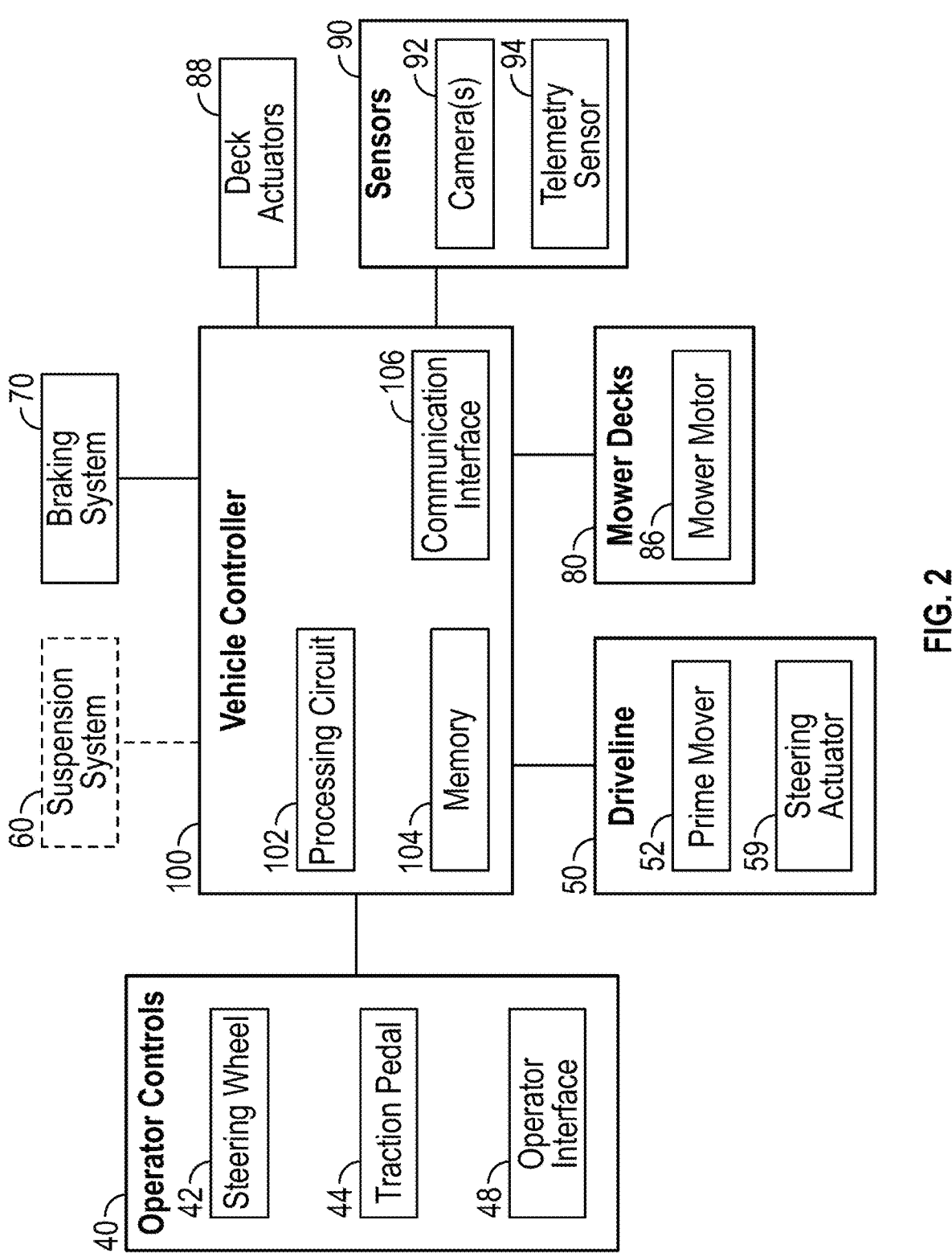
FIG. 2 is a schematic block diagram of the vehicle of FIG. 1A or FIG. 1B, according to an exemplary embodiment.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower a mower deck 80, etc.). As shown in FIGS. 1A, 1B, and 2, the operator controls 40 include a steering interface (e.g., a steering wheel, joystick(s), etc.), shown steering wheel 42, an accelerator interface and/or braking interface (e.g., a pedal, a throttle, etc.), shown as traction pedal 44, and one or more additional interfaces, shown as operator interface 48. The steering wheel 42 may be used by an operator to indicate a desired steering direction of the vehicle 10. The traction pedal 44 may be used to control the speed and direction of travel of the vehicle 10. By way of example, pressing the traction pedal 44 in a first direction may cause the driveline 50 to move the vehicle 10 forward, and pressing the traction pedal 44 in an opposing section direction may cause the driveline 50 to move the vehicle 10 rearward. Returning the traction pedal 44 to a middle or neutral position may cause the braking system 70 and/or the driveline 50 to slow or stop the vehicle 10 or to hold the vehicle 10 in place. Alternatively, the operator interface 48 may include a pair of handles that act as a steering interface and control the driveline 50 in a zero-turn configuration (e.g., a left joystick to control the left side of the driveline 50 and a right joystick to control a right side of the driveline 50). The operator interface 48 may be used to control operation of the mower decks 80 (e.g., changing a cutting speed of a mower deck 80, changing a cutting height of a mower deck 80, etc.). The operator interface 48 may include one or more displays (e.g., user devices, displays installed in the vehicle 10, etc.) and one or more input devices. The one or more displays may be or include a touchscreen, an LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1A, 1B, and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is one or more electric motors and the energy storage 54 is a battery system. In some embodiments, the driveline 50 is a fuel cell electric driveline whereby the prime mover 52 is one or more electric motors and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiments shown in FIGS. 1A and 1B, the rear tractive assembly 56 includes rear tractive elements and the front tractive assembly 58 includes front tractive elements that are configured as wheels. In some embodiments, the rear tractive elements and/or the front tractive elements are configured as tracks. In some embodiments, the driveline 50 is omitted, and the vehicle 10 is propelled by an operator (e.g., the vehicle 10 is configured as a push mower).

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., based on an input from the steering wheel 42 and using a steering actuator 59 that controls the orientation of one or more wheels). In some embodiments, both the rear tractive assembly 56 and the front tractive assembly 58 are fixed and not steerable (e.g., employ skid steer operations). By way of example, the driveline 50 may include a hydrostatic transmission that permits independent driving of the left and right sides of the driveline 50.

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, the driveline 50 is a hydrostatic transmission that performs braking by using hydraulic motors to oppose movement of the tractive elements.

Referring to FIGS. 1A and 1B, the vehicle 10 includes a series of mower decks 80 (e.g., cutting units, mowing assemblies, etc.). Each mower deck 80 includes a deck, housing, or enclosure, shown as housing 82, and a cutting element 84 (e.g., a blade, a flail, a reel, etc.) movably coupled to the housing 82. Specifically, the vehicle of FIG. 1A illustrates a vehicle 10 in which the mower decks 80 each include a cutting element 84 configured as a blade that rotates about a substantially vertical axis. FIG. 1B illustrates an alternative configuration in which the cutting elements 84 are configured as reels that each rotate about a substantially horizontal axis. Except as otherwise specified, the vehicle 10 of FIG. 1A may be substantially similar to the vehicle 10 of FIG. 1B. Accordingly, a description of the vehicle 10 of FIG. 1A may apply to the vehicle 10 of FIG. 1B, except as otherwise specified.

Referring to FIGS. 1A and 1B, the housing 82 may open downward to expose the cutting element 84 to vegetation below the housing 82. A motor or actuator (e.g., an electric motor, a hydraulic motor, etc.), shown as mower motor 86, is coupled to the housing 82 and drives movement (e.g., rotation, oscillation, etc.) of the cutting element 84. While driven by the mower motor 86, the cutting element 84 crushes, mulches, removes, or otherwise trims vegetation beneath the housing 82. Alternatively, the cutting element 84 may be driven by the prime mover 52 (e.g., through a power take off).

The vehicle 10 includes a series of linear actuators or height adjustment actuators, shown as deck actuators 88, each coupled to the frame 12 and to one or more of the mower decks 80. The deck actuators 88 permit control over a height of the corresponding mower deck 80 relative to the frame 12. The deck actuators 88 may set a cutting height of the mower deck 80. The cutting height represents a final height of vegetation that is trimmed by the mower deck 80. The deck actuators 88 may move the mower deck 80 to a travel position above the cutting height, in which the mower deck 80 is moved out of engagement with the vegetation and the ground surface. The travel position may be used when the vehicle 10 is traveling between job sites and/or the user does not wish to be trimming vegetation.

The sensors 90 may include various sensors positioned about the vehicle 10 to acquire vehicle information or vehicle data regarding operation of the vehicle 10, or the location thereof. The sensors 90 may include various sensors positioned about the vehicle 10 to acquire environment data regarding the environment surrounding the vehicle 10. By way of example, the sensors 90 may include an accelerometer, a gyroscope, a compass, a position sensor (e.g., a GPS sensor, an RTK sensor, etc.), an inertial measurement unit ("IMU"), suspension sensor(s), wheel sensors, an audio sensor or microphone, a camera, an optical sensor, a proximity detection sensor, linear potentiometers, and/or other sensors to facilitate acquiring vehicle information, vehicle data, or environment data regarding operation of the vehicle 10, the location thereof, and/or the surrounding environment.

As shown in FIG. 1-2, one or more of the sensors 90 are configured as an image sensor (e.g., a LIDAR sensor, an ultrasonic sensor, a video camera, an image capture device, etc.), shown as camera 92. The camera 92 is configured to acquire image data corresponding to the environment surrounding the vehicle 10. The camera 92 may be coupled to the body 20 of the vehicle 10. In some embodiments, the camera 92 is configured as a 360 degree camera configured to acquire image data corresponding to the environment surrounding the vehicle 10 with a 360 degree view extending outward from the vehicle 10. By way of example, the camera 92 may be coupled to an upper portion of the body 20 of the vehicle 10 such that the camera 92 may capture the image data with the 360 degree view around the vehicle 10. In other embodiments, more than one of the sensors 90 are configured as the cameras 92 and are collectively configured to capture the image data with the 360 degree view extending outward from the vehicle 10. By way of example, a first of the cameras 92 may be configured to acquire the image data corresponding to the environment surrounding the vehicle 10 positioned forward of the vehicle 10, a second of the cameras 92 may be configured to acquire the image data corresponding to the environment surrounding the vehicle 10 positioned rearward of the vehicle 10, a third of the cameras 92 may be configured to acquire the image data corresponding to the environment surrounding the vehicle 10 positioned on a first side of the vehicle 10, and a fourth of the cameras 92 may be configured to acquire the image data corresponding to the environment surrounding the vehicle 10 positioned on a second opposing side of the vehicle 10 such that a combined view of the cameras 92 is equivalent to the 360 degree view. In still other embodiments, the camera 92 is configured to capture the image data with view that is less than 360 degrees (e.g., 180 degrees, 90 degrees, etc.). Since the image data is acquired by the camera 92 of the vehicle 10, the image data may depict a portion of the golf course from a perspective substantially similar to a golfer positioned on the golf course.

As shown in FIG. 2, one or more of the sensors 90 are configured as a telematics sensor, shown as telemetry sensor 94, configured to facilitate detecting and obtaining vehicle telemetry data (e.g., acquiring telemetry data, etc.) including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data. In some embodiments, the telemetry data acquired by the telemetry sensor 94 indicates an absolute location of the vehicle 10 (e.g., a location of the vehicle 10 relative to the Earth). By way of example, the telemetry sensor 94 may include a global positioning system (GPS) that provides a global position of the vehicle 10. In various embodiments, the telemetry data acquired by the telemetry sensor 94 indicates a relative position of the vehicle 10 (e.g., a position of the vehicle 10 relative to a landmark, a position of the vehicle 10 relative to a reference point, a position of the vehicle 10 relative to a site, etc.). By way of example, the telemetry sensor 94 may acquire telemetry data that indicates a relative position of the vehicle 10 relative to a component of a golf course (e.g., a hole, a water feature, a club house, a tee box, etc.). In some embodiments, the sensors 90 (e.g., the accelerometer, the gyroscope, the compass, the IMU, etc.) may function as topography sensors configured to facilitate surveying and acquiring topography data regarding the terrain upon which the vehicle 10 is traveling. Further information and details regarding such surveying and acquisition of topography data using the vehicle 10 may be found in U.S. patent application Ser. No. 18/804,823, filed Aug. 14, 2024, which is incorporated herein by reference in its entirety.

As shown in FIG. 2, the vehicle controller 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle controller 100 includes a processing circuit 102, a memory 104, and a communication interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle controller 100 represents a collection of processing devices. In such cases, the processing circuit 102 represents the collective processors of the devices, and the memory 104 represents the collective storage devices of the devices.

In one embodiment, the vehicle controller 100 is configured to selectively engage, selectively disengage, control, or otherwise communicate with components of the vehicle 10 (e.g., via the communication interface 106, a controller area network ("CAN") bus, etc.).

According to an exemplary embodiment, the vehicle controller 100 is coupled to (e.g., communicably coupled to) components of the operator controls 40 (e.g., the steering wheel 42, the traction pedal 44, the brake 46, the operator interface 48, etc.), components of the driveline 50 (e.g., the prime mover 52), components of the braking system 70, the mower decks 80, the deck actuators 88, and the sensors 90. By way of example, the vehicle controller 100 may send and receive signals (e.g., control signals, location signals, etc.) with the components of the operator controls 40, the components of the driveline 50, the components of the braking system 70, the sensors 90, and/or remote systems or devices (via the communication interface 106 as described in greater detail herein).

The communication interface 106 facilitate communications (e.g., wired or wireless communications) between the vehicle 10 and other devices (e.g., other of the vehicles 10, the user sensors 220, the user portal 230, the remote systems 240, etc.). By way of example, the communication interface 106 may be configured to employ one or more types of wireless communications protocols including Bluetooth, Wi-Fi, radio, cellular, and/or other suitable wireless communications protocols.

Site Monitoring and Control System

Figure 3:
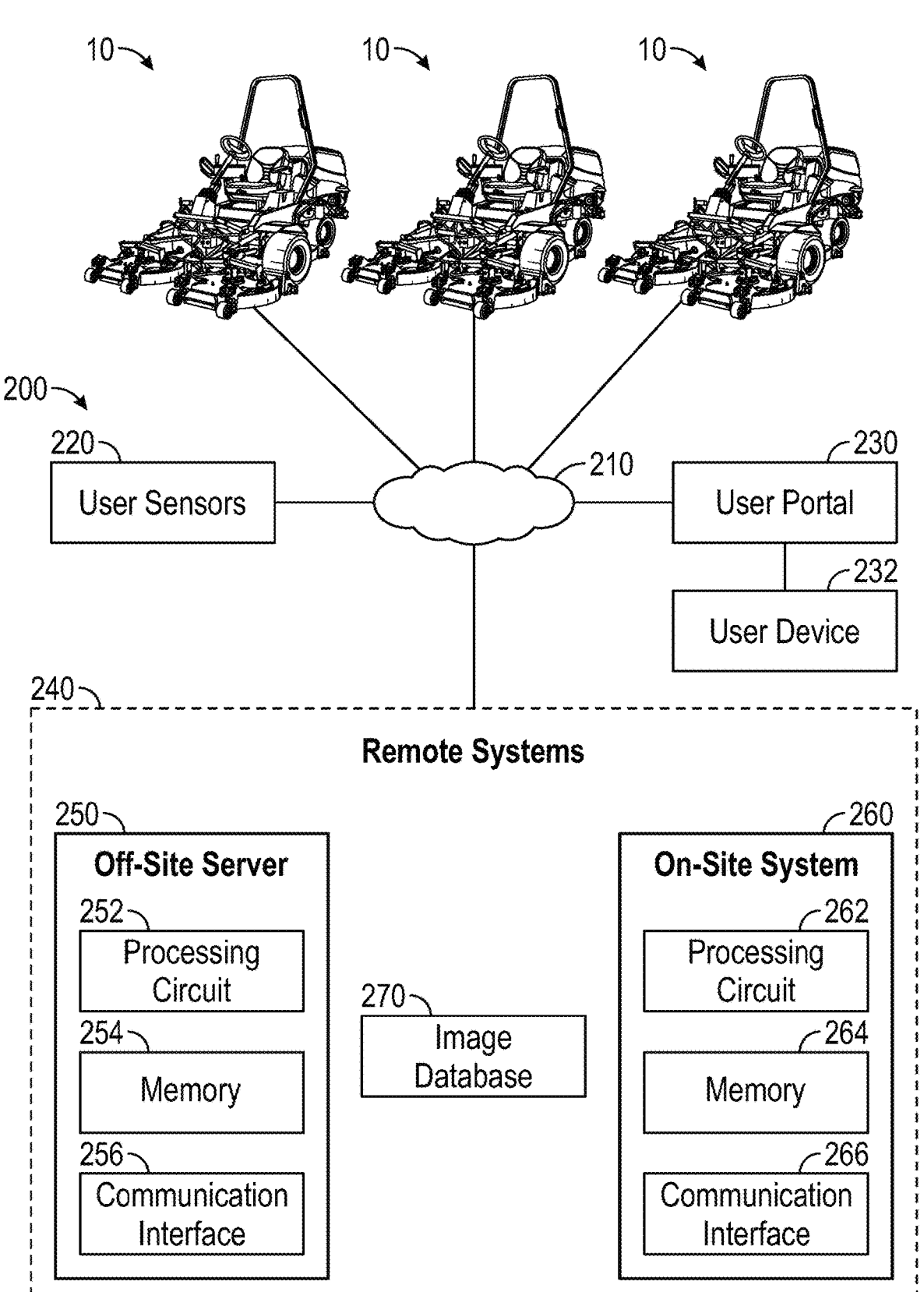
FIG. 3 is a is schematic block diagram of a site monitoring and control system including a plurality of the vehicles of FIG. 1A or FIG. 1B, according to an exemplary embodiment.

As shown in FIG. 3, a monitoring and control system, shown as site monitoring and control system 200, includes one or more vehicles 10; one or more second sensors, shown as user sensors 220, positioned remote or separate from the vehicles 10; an operator interface, shown as user portal 230, positioned remote or separate from the vehicles 10; an external or remote user device, shown as user device 232, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210 (e.g., using the communication interface 106). In some embodiments, the site monitoring and control system 200 does not includes the user portal 230 and/or the user device 232.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, hear rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, the image data, information available at the remote systems 240, etc. to manage and operate the site (e.g., golf course) such as to scout the site, to determine strategies (e.g., golfing strategies, etc.) associated with the site, for advanced scheduling purposes, to identify persons braking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). In some embodiments, the user portal 230 is implemented on a website configured to be accessible via a web browser (e.g., an internet browser application, etc.). As shown in FIG. 3, the user portal 230 is accessible via the user device 232. The user device 232 may be or include a computer, laptop, smartphone, tablet, or the like. The user portal 230 and the user device 232 may communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230. According to an exemplary embodiment, the user portal 230 is accessible via the operator interface 48. For example, when the operator interface 48 includes the one or more displays, the one or more displays may be configured to display the one or more GUIs of the user portal 230. The user portal 230 and the operator interface 48 may communicate via the communications network 210.

As shown in FIG. 3, the remote systems 240 include a first remote system, shown as off-site server 250, a second remote system, shown as on-site system 260 (e.g., in a clubhouse of a golf course, on the golf course, etc.), and a database, shown as image database 270. In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

The image database 270 is configured to store data within the remote systems 240. For example, the image database 270 may store image data acquired by the camera 92 of the vehicle 10, telemetry data acquired by the telemetry sensor 94 of the vehicle 10, topography data of the site acquired by the sensors 90 of the vehicle 10, and/or data associated with a site (e.g., a golf course, a driving range, a park, etc.) where the vehicle 10 is stationed. The image database 270 is communicably coupled to at least one of the off-site server 250 or the on-site system 260 such that data can be transferred between (a) the image database 270 and (b) the off-site server 250 and/or the on-site system 260. In some embodiments, the image database 270 is positioned on-site (e.g., at a same location as the on-site system 260, etc.). In other embodiments, the image database 270 is positioned off-site (e.g., at a same location as the off-site server 250, at a different location from the off-site server 250 and the on-site system 260, etc.). In some embodiments, the image database 270 is a cloud-based database.

According to an exemplary embodiment, the remote systems 240 (e.g., the off-site server 250, the on-site system 260, the image database 270, etc.) are configured to communicate with the vehicles 10 and/or the user sensors 220 via the communications network 210. By way of example, the remote systems 240 may receive the vehicle data from the vehicles 10 and/or the operator data from the user sensors 220. By way of another example, the image database 270 of the remote systems 240 may receive the image data, the location data, and/or the topography data via the communications network 210. The remote systems 240 may be configured to perform back-end processing of the vehicle data, the image data, the location data, the topography data, and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle controllers 100 may use to make control decisions). By way of another example, the remote systems 240 may send commands or instructions to the vehicles 10 to implement. By way of yet another example, the remote systems 240 may send user interfaces corresponding to the image data, the topography data, and/or the location data stored in the image database 270 to the vehicles 10 and/or to the user device 232 to be displayed to a user.

According to an exemplary embodiment, the remote systems 240 (e.g., the off-site server 250, the on-site system 260, and/or the image database 270) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

In some embodiments, the remote systems 240 (e.g., the off-site server 250 and/or the on-site system 260) are configured to associate (a) the image data received from the camera 92 of the vehicle 10 and/or the topography data with (b) a location included in the telemetry data received from the telemetry sensor 94 of the vehicle 10. By way of example, the vehicle 10 may provide the image data, the topography data, and the telemetry data acquired by the sensors 90 to the remote systems 240. The remote systems 240 may determine a location of the vehicle 10 when the sensors 90 acquired the image data and the topography data by extracting the location from the telemetry data and associate the location with the image data and the topography data. By way of example, the remote systems 240 may determine the location of the vehicle 10 when the camera 92 acquired the image data by determining a time when the camera 92 acquired the image data and determining a portion of the telemetry data that corresponds to that time. In some embodiments, the remote systems 240 are configured to update the image data and/or the topography data to include the location. In other embodiments, the remote systems 240 are configured to generate location data corresponding to the location and associate the location data with the image data and/or the topography data (e.g., tie the location data to the image data, assign common keys to the image data and the location data, etc.). The remote systems 240 may store (a) the image data and/or the topography data and (b) the associated location in the image database 270.

In some embodiments, the remote systems 240 (e.g., the off-site server 250 and/or the on-site system 260) are configured to generate image scores associated with the image data received from the camera 92 of the vehicle 10. The image scores may correspond to a perceived quality of the image data (e.g., a quality of the image data compared to existing image data stored in the image database 270, etc.). By way of example, the image scores may correspond to a likelihood that the image data will be provided to the user portal 230 by the remote systems 240. The remote systems 240 may prioritize storing the image data with higher image scores in the image database 270 such that the image data stored in the image database 270 is of a higher quality than the image data that is not stored in the image database 270.

In some embodiments, the remote systems 240 (e.g., the off-site server 250 and/or the on-site system 260) generate the image scores associated with the image data based at least partially on a clarity of the image data (e.g., as a clarity score, as a clarity score element, etc.). The remote systems 240 may utilize image analysis techniques (e.g., image recognition programs, etc.) to determine the clarity of the image data based on a sharpness associated with the image data, a contrast associated with the image data, a noise associated with the image data, and/or a focus associated with the image data. By way of example, the remote systems 240 may generate a first image score associated with first image data that is higher than a second image score associated with second image data if a first image included in the first image data has a higher clarity than a second image included in the second image data. As a result, the remote systems 240 may prioritize storing the image data that has a high clarity in the image database 270.

In some embodiments, the remote systems 240 (e.g., the off-site server 250 and/or the on-site system 260) are configured to generate the image scores associated with the image data based at least partially on a recency of the image data (e.g., as a recency score, as a recency score element, etc.). The remote systems 240 may utilize a time when the camera 92 of the vehicle 10 acquired the image data to determine the recency of the image based on a time that has passed since the image data was captured. By way of example, the remote systems 240 may generate a first image score associated with first image data that is higher than a second image score associated with second image data if a first time corresponding to when the first image data was acquired occurred more recently than a second time corresponding to when the second image data was acquired. As a result, the remote systems 240 may prioritize storing the image data that was acquired more recently in the image database 270. Similarly, the remote systems may be configured to favor more recent topography data, overwriting or replacing old older topography data.

In some embodiments, the remote systems 240 (e.g., the off-site server 250 and/or the on-site system 260) are configured to receive site attribute data associated with a site (e.g., a golf course, a site where the vehicle 10 is stationed, etc.) via the communications network 210. The site attribute data corresponds to attributes of the site, such as topography, current weather conditions, or ground conditions. In some embodiments, the remote systems 240 receive the site attribute data from the user portal 230. By way of example, when the site is a golf course, the site attribute data may be golf course attribute data that includes hole locations of holes on the golf course, green locations of greens of the golf course, water feature locations of water features of the golf course, and/or tee box locations of tee boxes of the golf course. A user of the user portal 230 may input the hole location (e.g., a pin location, etc.) into the user portal 230 and the user portal 230 may provide the hole location to the remote systems 240 (e.g., via the communications network 210, etc.). By way of another example, the attribute data (e.g., pin positions, tee positions, course hazards, etc.) may be acquired from GPS devices (e.g., a user sensor 220, a hand-held TruPin GPS device offered by E-Z-GO® used by a groundskeeper of the golf course, a vehicle GPS of the vehicle 10, etc.) positioned or positionable proximate the pins, the tees, and/or the hazards, respectively. By way of another example, the site attribute data may include weather data associated with the site. The remote systems 240 may receive the weather data from an external system (e.g., a weather system, a weather forecasting system, etc.) and/or from the user portal 230 (e.g., inputted by the user of the user portal 230, etc.). The remote systems 240 may store the site attribute data in the image database 270.

In some embodiments, the remote systems 240 (e.g., the off-site server 250 and/or the on-site system 260) are configured to generate at least a portion of the site attribute data associated with the site based on the vehicle data received from the vehicle 10. By way of example, the remote systems 240 may receive the telemetry data from the telemetry sensor 94 via the communications network 210 and the remote systems 240 may generate a portion of the site attribute data corresponding to ground slopes (e.g., slopes, etc.) of the site based on the telemetry data including slopes of the vehicle 10 while the vehicle 10 is traversing the site and the locations corresponding to the slopes of the vehicle 10, such that the remote systems 240 may generate the portion of the site attribute data that maps out the slopes of the site (i.e., the topography data). By way of another example, the remote systems 240 may receive the telemetry data from the telemetry sensor 94 via the communications network 210 and the remote systems 240 may generate a portion of the site attribute data corresponding to ground conditions (e.g., roughness of the ground, slickness of the ground, height of grass on the ground, etc.) based on the telemetry data including vibrations experienced by the vehicle 10 while the vehicle 10 is traversing the site and locations corresponding to the vibrations experienced by the vehicle 10, such that the remote systems 240 may generate the portion of the site attribute data that maps out the ground conditions of the site.

In some embodiments, the remote systems 240 (e.g., the off-site server 250 and/or the on-site system 260) are configured to generate graphical user interfaces corresponding to the image data, the telemetry data, and/or the site attribute data (e.g., the topography data) stored in the image database 270. The remote systems 240 may provide the graphical user interfaces to the user portal 230 such that the graphical user interfaces may be displayed to the users of the vehicle 10 (e.g., via the operator interface 48, etc.) and/or the users of the user device 232. By way of example, the graphical user interfaces may include an image included in the image data associated with a location and a ground condition associated with the site attribute data associated with the location. In some embodiments, the remote systems 240 are configured to generate and provide the graphical user interfaces associated with a location to the user portal 230 in response to receiving an input from a user of the user portal 230 associated with the location. By way of example, the graphical user interfaces associated with a location on a golf course may include image data associated with the location on the golf course, weather associated with the golf course, a distance from the location to a hole of the golf course, topography information at and/or proximate the location (e.g., ground slope), and/or a ground condition associated with the location.

In some embodiments, the remote systems 240 (e.g., the off-site server 250 and/or the on-site system 260) are configured to modify the image data to obscure (e.g., hide, blur, remove, etc.) unauthorized or sensitive components of the image data. The unauthorized or sensitive components may include people, private property, illegal objects, inappropriate gestures, text, and/or other components of the image data that should not be included in the graphical user interfaces generated by the remote system 240 and provided to the user portal 230. By way of example, the remote systems 240 may blur (e.g., scramble, deface, etc.) portions of the image data corresponding to the unauthorized or sensitive components such that the unauthorized or sensitive components of the image data are no longer visible. The remote systems 240 may identify the unauthorized or sensitive components of the image data using image recognition techniques. By way of example, the remote systems 240 may compare components of the image data with reference image data stored in the image database 270 associated with the unauthorized or sensitive components in order to identify components of the image data that are unauthorized or sensitive components. The remote systems 240 may identify unauthorized or sensitive components of the image data by matching components of the image data with components of the reference image data. The reference image data may include various images depicting unauthorized or sensitive components (e.g., images of people, images of text, images of obscene gestures, etc.). In some embodiments, the remote systems 240 are configured to obscure the unauthorized or sensitive components of the image data between receiving the image data from the vehicle 10 and providing the image data to the image database 270. In other embodiments, the remote systems 240 are configured to obscure the unauthorized or sensitive components of the image data prior to retrieving the image data from the image database 270 and generating the graphical user interface corresponding to the image data.

In some embodiments, the image database 270 is configured to provide at least a portion of the data stored within the image database 270 to external systems (e.g., third party system, etc.). By way of example, a golf simulator system may acquire data stored within the image database 270 associated with a golf course in order to operate a golf simulator utilizing the image data, the telemetry data, and/or the site attribute data stored within the image database 270. The golf simulator system may utilize the data acquired from the image database 270 to generate the golf simulator such that the golf simulator includes up-to-date images of the golf course based on the image data and/or up-to-date conditions (e.g., weather, hole positions, tee positions, ground conditions, topography. etc.) associated with the golf course based on the site attribute data.

Method of Updating Image Database

Figure 4:
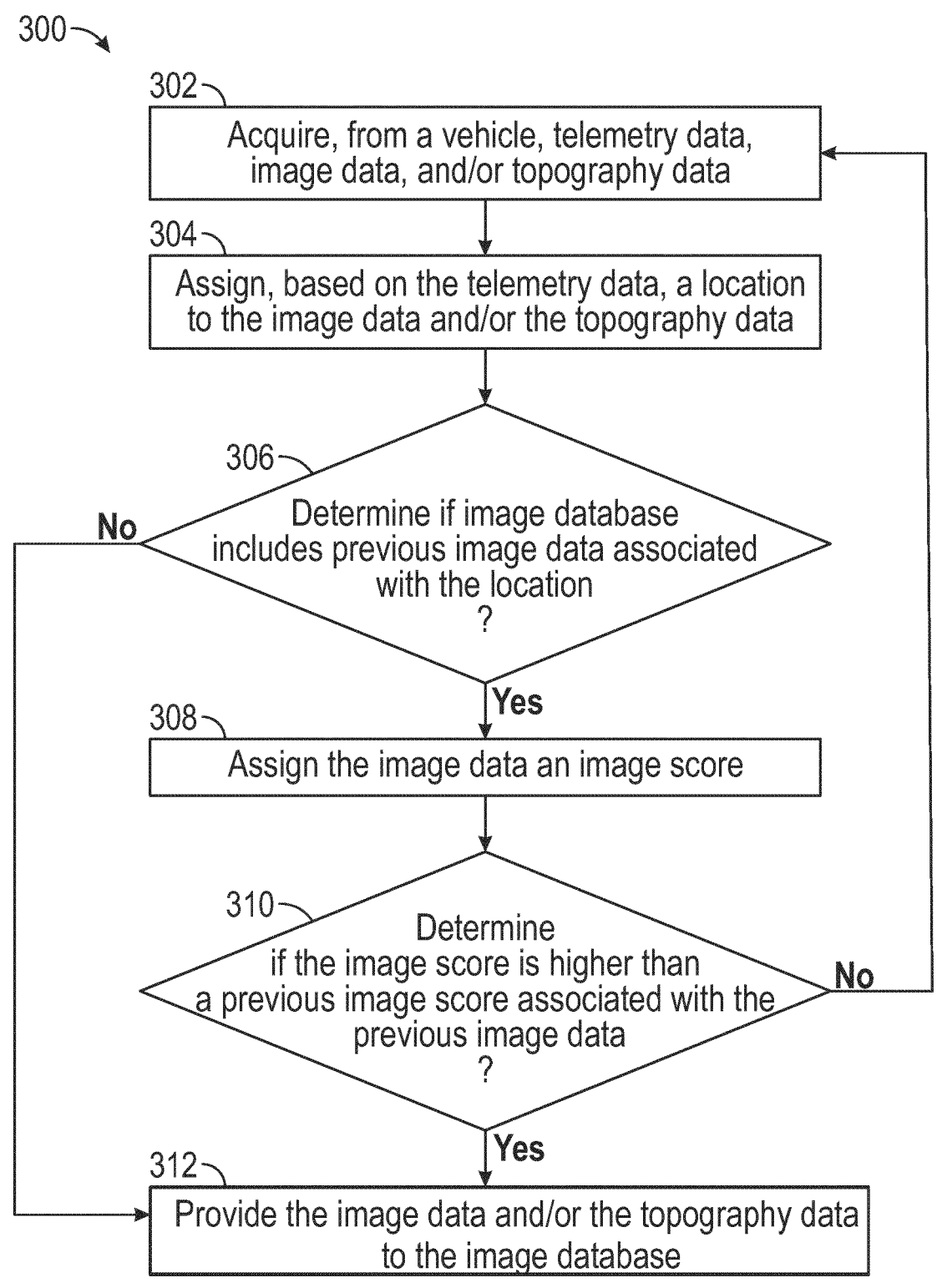
FIG. 4 is a flow chart of a method for updating an image database associated with a golf course using the site monitoring and control system of FIG. 3, according to an exemplary embodiment.

As shown in FIG. 4, a method 300 for updating an image database includes steps 302-312. The method 300 may be executed by, for example, the site monitoring and control system 200. Further, any computing device described herein can be configured to perform at least a portion of the method 300 (e.g., the vehicle controller 100, the user device 232, the off-site server 250, the on-site system 260, etc.). According to an exemplary embodiment, the method 300 is for updating an image database corresponding to a golf course. By way of example, the method 300 may be for systematically replacing previous image data associated with the golf course that is stored in the image database with new image data received from a vehicle such that the image database stores image data that is current and of high quality.

As shown in FIG. 4, the method 300 begins with acquiring telemetry data, image data, and/or topography data at step 302. In some embodiments, the telemetry data, the image data, and/or the topography data are acquired from a vehicle. The vehicle may be the vehicle 10, the telemetry data may be acquired by the telemetry sensors 94 of the vehicle 10, the image data may be acquired by the camera 92, and/or the topography data may be acquired by the sensors 90 (e.g., an IMU, a gyroscope, an accelerometer, etc.), as described herein. In such embodiments, the telemetry data, the image data, and/or the topography data may be received by the remote systems 240 from the vehicle 10 via the communications network 210. In other embodiments, the telemetry data, the image data, and/or the topography data are acquired from another source (e.g., a personal camera, a handheld camera, a topography scanner, etc.).

As shown in FIG. 4, the method 300 includes assigning a location to the image data and/or the topography data at step 304. In some embodiments, the location is assigned to the image data and/or the topography data based on the telemetry data. By way of example, the telemetry data acquired by the telemetry sensor 94 of the vehicle 10 may include a location of the vehicle 10 (e.g., a relative location of the vehicle 10, an absolute location of the vehicle 10, etc.). The remote systems 240 may determine the location that corresponds to the image data and/or the topography data based on determining a time when the camera 92 acquired the image data and determining a portion of the telemetry data that corresponds to that time.

As shown in FIG. 4, the method 300 includes determining if an image database includes previous image data associated with the location at step 306. By way of example, the location assigned to the image data at step 304 may be compared with locations assigned to the previous image data stored in the image data based to determine if the image data based includes the previous image data associated with the location. The remote systems 240 may compare the image data received from the vehicle 10 and the location associated with the image data with previous image data stored in the image database 270 and locations associated with the previous image data to determine if the location associated with the image data received from the vehicle 10 is associated with any of the previous image data stored in the image database 270.

In response to the image database including the previous image data associated with the location (step 306 "Yes"), method 300 proceeds to step 308. In response to the image database not including the previous image data associated with the location (step 306 "No"), method 300 proceeds to step 312.

As shown in FIG. 4, the method 300 includes assigning the image data an image score at step 308. The image score corresponds to a quality (e.g., a quality level, etc.) associated with the image data. By way of example, the image score may be assigned based on a clarity associated with the image data, a recency associated with the image data, and/or other attributes associated with the image data (e.g., weather conditions associated with the image data, a contrast associated with the image data, whether the image data includes unauthorized components, etc.). In some embodiments, image analysis techniques are utilized to generate the image score associated with the image data. The remote systems 240 perform step 308 by generating and assigning the image score to the image data based on attributes associated with the image data.

As shown in FIG. 4, the method 300 includes determining if the image score assigned to the image data is higher than a previous score associated with the previous image data at step 310. The image score assigned to the image data is compared with the previous image data associated with the previous image data to determine if the image data is of higher quality than the previous image data. By way of example, if the previous image data is associated with a first image score and the image data is assigned a second image score that is higher than the first image score, the comparison of the image scores may indicate that the image data has a higher clarity (e.g., a greater contrast, a higher sharpness, a higher focus, better lighting, etc.) than the previous image data. By way of another example, if the previous image data is associated with a first image score and the image data is associated with a second image score that is higher than the first image score, the comparison of the image scores may indicate that the image data includes fewer unauthorized components (e.g., people, private property, areas that are off limit, etc.) than the previous image data, which may be preferred since unauthorized components may need to be blurred (e.g., distorted, hidden, etc.) before the image data can be presented to the public. In some embodiments, the score assigned to the image data is considered to be higher than the previous score associated with the previous image data if a time since the previous image data was acquired is greater than a time threshold. By way of example, if the previous image data was acquired during a time that occurred over a year ago and the time threshold is a year, the image data assigned to the image data may be considered higher than the previous image data associated with the previous image based on the time occurring longer ago than the time threshold. The remote systems 240 may perform step 310 by comparing the image score assigned to the image data during step 308 with the previous image score associated with the previous image data stored in the image database 270.

In response to the score being higher than the previous score associated with the previous image data (step 310 "Yes), method 300 proceeds to step 310. In response to the score not being higher than the previous score associated with the previous image data (step 310 "No"), method 300 returns to step 302.

As shown in FIG. 4, the method 300 includes providing the image data and/or the topography data to the image database at step 312. By way of example, the image data may be provided to the image database to be stored in the image database. In some embodiments, step 312 includes providing the image score associated with the image data to the image database such that the image score may be compared with future image scores associated with future image data when the method 300 is followed in the future. In some embodiments, step 312 includes replacing the previous image data with the image data such that the previous image data is no longer stored in the image database. As a result, an amount of storage required by the image database may be reduced when compared to an image database that stores both the image data and the previous image data. The remote systems 240 may perform step 312 by providing the image data to the image database 270 such that the image data is stored in the image database.

Method of Providing Graphical User Interface

Figure 5:
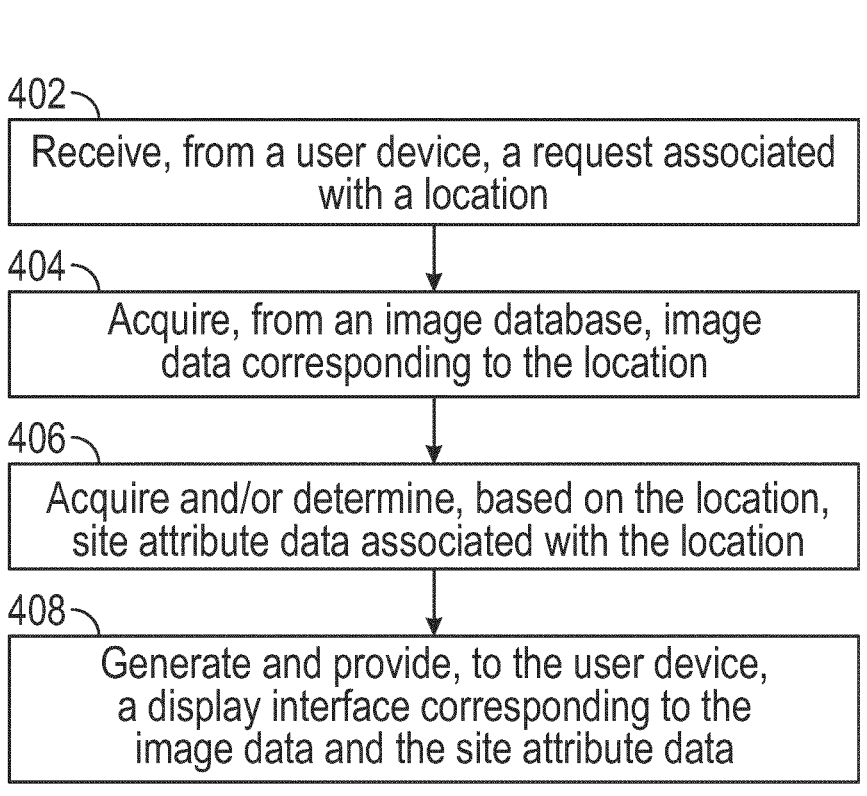
FIG. 5 is a flow chart of a method for providing a display interface corresponding to image data and site attribute data associated with a golf course to a user portal, according to an exemplary embodiment.

As shown in FIG. 5, a method 400 for providing a graphical user interface includes steps 402-408. The method 400 may be executed by, for example, the site monitoring and control system 200. Further, any computing device described herein can be configured to perform at least a portion of the method 400 (e.g., the vehicle controller 100, the user device 232, the off-site server 250, the on-site system 260, etc.). According to an exemplary embodiment, the method 400 is for providing a graphical user interface to a user that corresponds to a location on a golf course based on receiving a user input from the user associated with the location. By way of example, the graphical user interface may include image data associated with the location on the golf course and/or golf course attribute data associated with various attributes of the golf course such that the user may preview various locations around the golf course and/or make decisions regarding shots that the user will take at the various locations.

As shown in FIG. 5, the method 400 begins with receiving an image request associated with a location at step 402. In some embodiments, the image request is received from a user device. The user device may be the user device 232 and/or the operator interface 48 of the vehicle 10. In such embodiments, the image request is received by the remote systems 240 from the user device 232 and/or the vehicle 10 via the communications network 210. The image request may be generated based on a user input associated with the location. By way of example, a user may interface with the user portal 230 (e.g., via the user device 232, via the operator interface 48 of the vehicle 10, etc.) to generate a user input associated with a location of a golf course (e.g., tee box on hole 4, green on hole 17, fairway on hole 7, etc.). The user portal 230 may generate an image request associated with the location of the golf course based on the user input and may provide the image request to the remote systems 240 via the communications network 210.

As shown in FIG. 5, the method 400 includes acquiring image data corresponding to the location at step 404. In some embodiments, the image data is acquired from an image database. The remote systems 240 may acquire the image data from the image database 270 based on the location associated with the image request received during step 402. By way of example, the image database 270 may store image data and may label the image data based on various locations associated with the image data. The remote systems 240 may utilize the location associated with the image request to request (e.g., pull, etc.) the image data corresponding to the location from the image database 270. In some embodiments, the remote systems 240 determine which of the image data corresponds to the location to request from the image database 270 based on the image scores associated with the image data. By way of example, the image database 270 may store first image data with a first image score corresponding to a location and second image data with a second image score corresponding to the location. The remote systems 240 may request the second image data based on the second image score being higher than the first image score. In some embodiments, the image data acquired at step 404 from the image database 270 is the image data generated by the camera 92 of the vehicle 10. As a result, the image data acquired at step 404 may depict a portion of the golf course from a perspective of a golfer positioned on the golf course.

As shown in FIG. 5, the method 400 includes acquiring and/or determining, based on the location, site attribute data associated with the location at step 406. The site attribute data corresponds to attributes of the site, such as topography, current or predicted weather conditions, and/or ground conditions. The site attribute data may be acquired by the remote systems 240 via the communications network 210, acquired by the remote systems 240 from the image database 270, and/or generated by the remote systems 240 based on the vehicle data acquired from the vehicle 10.

As shown in FIG. 5, the method 400 includes generating and providing a display interface corresponding to the image data and the site attribute data at step 408. In some embodiments, the display interface is provided to the user device. The display interface may provide the image data and the site attribute data to a user of the user device such that a user of the user device can access the image data and the site attribute data. By way of example, the display interface may include image data and site attribute data associated with a golf course such that a user of the user device may visualize (e.g., preview, etc.) the golf course (e.g., during a round of golf, prior to a round of golf, etc.) and be informed of attributes associated with the golf course.

Figure 6:
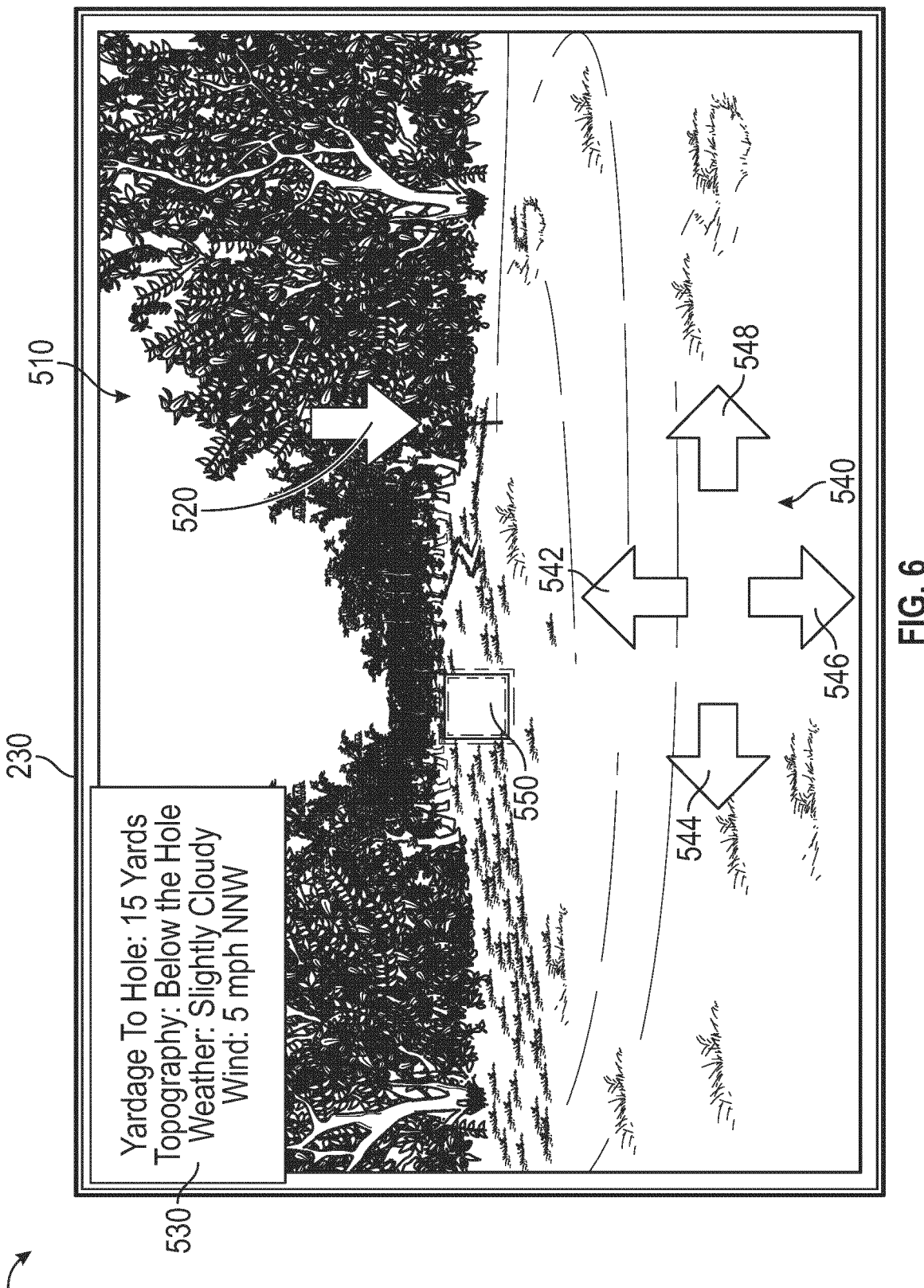
FIG. 6 is a display interface provided to the user portal by the process of FIG. 5, according to an exemplary embodiment.

According to the exemplary embodiment shown in FIG. 6, the method 400 generates and provides a display interface, shown as user interface 500, to the user device. The user interface 500 corresponds to the location associated with the request received in step 402. The user interface 500 may be generated by the remote systems 240 and provided to the user portal 230. The user portal 230 may present the user interface 500 on the user device 232 and/or the operator interface 48 of the vehicle 10. In some embodiments, the user interface 500 is generated and provided by the remote systems 240 and is transmitted to the user portal 230 via the communications network 210 to be displayed to a user.

As shown in FIG. 6, the user interface 500 includes an image, shown as site image 510, a first element, shown as indicator element 520, a second element, shown as attribute element 530, a plurality of actionable elements, shown as actionable items 540, and a third element, shown as privacy element 550. The site image 510 displays an image included in the image data acquired during step 404 of the method 400. By way of example, when the request received during step 402 of the method 400 is associated with a location on a golf course, the site image 510 may display an image of the location on the golf course that is included in the image data corresponding to the location.

As shown in FIG. 6, the indicator element 520 indicates an element of interest depicted in the site image 510. By way of example, when the request received during step 402 of the method 400 is associated with the location on the golf course, the indicator element 520 may indicate a position of a hole (e.g., a pin, etc.) of the golf course such that a user may identify the location of the hole in the site image 510. The position of the indicator element 520 may be determined based on the site attribute data received during step 406 of the method 400. By way of example, the position of the hole of the golf course may be modified between different days. The site attribute data may include a current position of the hole of the golf course such that the indicator element 520 may indicate the current position of the hole of the golf course on the site image 510 to provide accurate information to the user of the user interface 500. According to the exemplary embodiment shown in FIG. 6, the indicator element 520 is a red arrow indicating the position of the element of interest in the site image 510. In various embodiments, the indicator element 520 include a variety of other text-based, color-based, or symbol-based indicators indicating the position of the element of interest in the site image 510. By way of example, the indicator element 520 may include a color-coded indicator (e.g., a red indicator that the location corresponding to the image data is a far distance away from a location of the element of interest, a yellow indicator that the location corresponding to the image data is a medium distance away from the location of the element of interest, a green indicator that the location corresponding to the image data is a close distance away from the location of the element of interest, etc.), a predetermined shape-based symbol (e.g., a plus sign to indicate that the location corresponding to the image data is positioned lower than the location of the element of interest, an equal sign to indicate that the location corresponding to the image data is positioned at an equal altitude to the location of the element of interest, a minus sign to indicate that the location corresponding to the image data is positioned above the location of the element of interest, etc.) or any other suitable type of indicators.

As shown in FIG. 6, the attribute element 530 indicates attributes included in the site attribute data acquired during step 406 of the method 400. By way of example, when the request received during step 402 of the method 400 is associated with the location on the golf course, the attribute element 530 may indicate a distance between the location on the golf course and a hole of the golf course, an elevation change between the location on the golf course and the hole of the golf course, a topography of a green or other portions of the hole, and/or weather conditions associated with the golf course (e.g., wind speed, wind direction, precipitation, cloud conditions, etc.). In some embodiments, the attribute element 530 is overlaid over the site image 510 (e.g., break lines to show the topography of the hole, etc.).

As shown in FIG. 6, the actionable items 540 include a first actionable item, shown as a forward arrow 542, a second actionable item, shown as left arrow 544, a third actionable item, shown as backward arrow 546, and a fourth actionable item, shown as right arrow 548. Each of the actionable items 540 are associated with changing the location associated with the request received during step 402. By way of example, the forward arrow 542 may be associated with moving the location forward (e.g., toward a hole of a golf course, forward with respect to the site image 510, etc.), the left arrow 544 may be associated with moving the location sideways in a first direction (e.g., left with respect to the site image 510, etc.), the backward arrow 546 may be associated with moving the location rearward (e.g., away from the hole of the golf course, rearward with respect to the site image 510, etc.), and the right arrow 548 may be associated with moving the location sideways in a second opposing direction (e.g., right with respect to the site image 510, etc.). The user of the user device may select one of the actionable items 540 to change the location associated with the user interface 500. By way of example, the actionable items 540 cause the remote systems 240 to receive an updated request associated with an updated location, acquire image data corresponding to the updated location, determine updated site attribute data associated with the updated location, and generate and provide an updated user interface corresponding to the updated image data and the updated site attribute data. As a result, the user of the user device may operate the actionable items 540 to change locations shown in the display interfaces provided to the user device. By way of example, when the locations are on a golf course, the user may change the display interfaces to display different locations around the golf course such that the user may preview the golf course and/or make decisions regarding their play on the golf course.

As shown in FIG. 6, the privacy element 550 obscures unauthorized or sensitive portions of the site image 510. The unauthorized or sensitive portions of the site image 510 may be associated with the unauthorized or sensitive components of the image data identified by the remote systems 240. According to the exemplary embodiment shown in FIG. 6, the privacy element 550 is a solid shape that covers the unauthorized or sensitive portions of the site image 510 such that the user of the user device cannot see the unauthorized or sensitive portions of the site image 510. In other embodiments, the privacy element 550 may blur, distort, or otherwise hide the unauthorized or sensitive portions of the site image 510.

In some embodiments, the method 400 includes receiving an actionable input from the user device. By way of example, the actionable input may be received from the user device responsive to the user device selecting one of the site images 510 of the user interface 500. The actionable input may be associated with an updated location (e.g., a location that is different from the location associated with the request received during step 402, etc.). By way of example if the actionable input is associated with the forward arrow 542, the updated location may be positioned forward of the location associated with the request received during step 402. In some embodiments, the method 400 includes acquiring updated image data corresponding to the updated location associated with the actionable input. The updated image data may be acquired from the image database. In some embodiments, the method 400 includes determining updated site attribute data associated with the updated location. The updated site attribute data may be determined based on the updated location.

Figure 7:
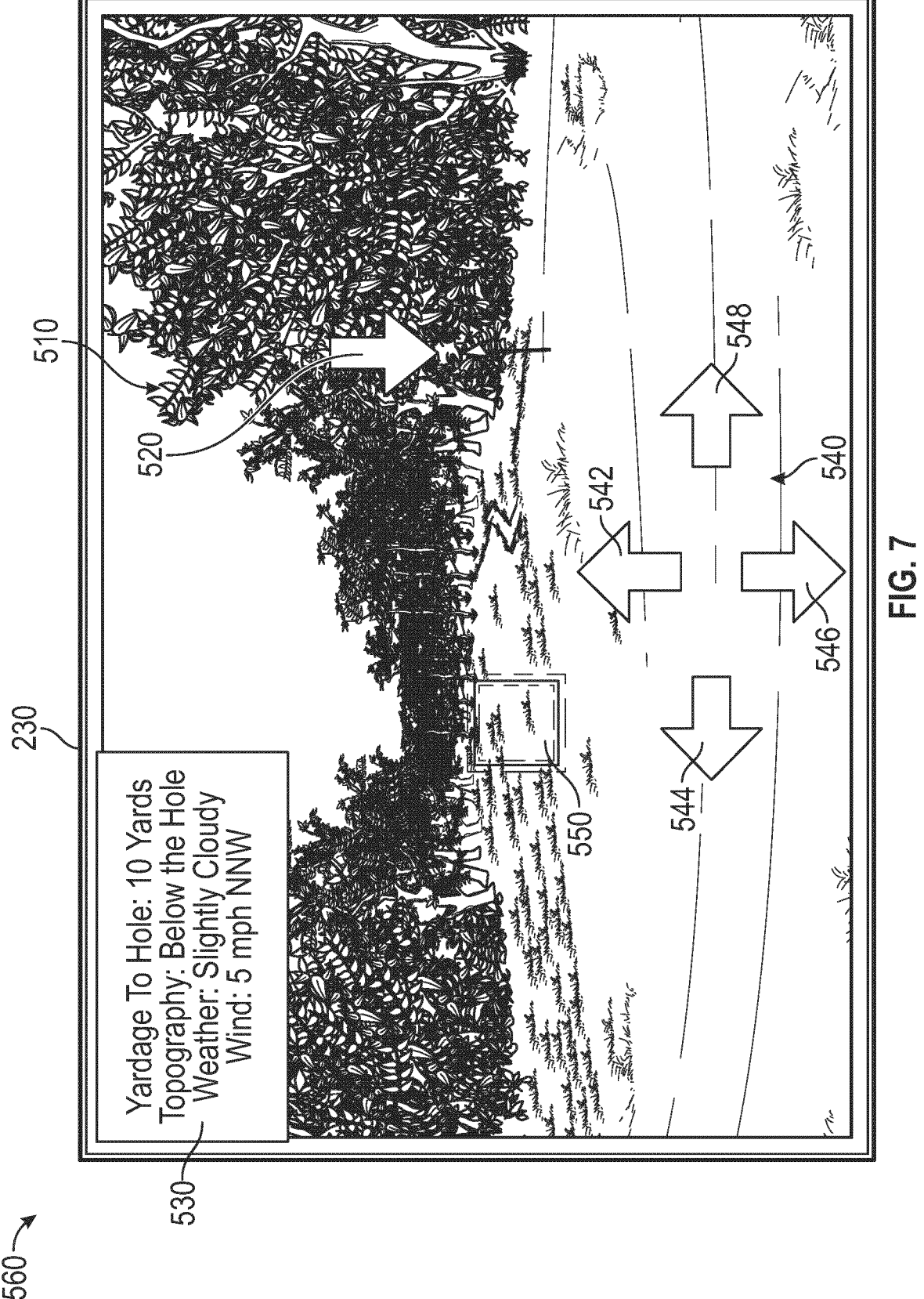
FIG. 7 is another display interface provided to the user portal by the process of FIG. 5, according to an exemplary embodiment.

According to the exemplary embodiment shown in FIG. 7, the method 400 generates and provides an updated display interface, shown as updated user interface 560, to the user device. The updated user interface 560 correspond to the updated location associated with the actionable input received from the user device. The user interface 500 may be generated by the remote system 240 and provided to the user portal 230. The user portal 230 may present the updated user interface 560 on the user device 232 and/or the operator interface 48 of the vehicle 10. In some embodiments, the user interface 500 is generated and provided by the remote systems 240 and is transmitted to the user portal 230 via the communications network 210 to be displayed to a user.

As shown in FIG. 7, the user interface 500 includes the site image 510, the indicator element 520, the attribute element 530, the actionable items 540, and the privacy element 550. The site image 510 displays an image included in the image data that correspond to the updated location. The indicator element 520 indicates the element of interest depicted in the site image 510. The attribute element 530 indicates attributes included in the updated site attribute data. The privacy element 550 obscures unauthorized components of the site image 510 (e.g., unauthorized or sensitive components included in the updated image data).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the vehicle controller 100, etc.) as shown in the various exemplary embodiments is illustrative only. Additionally, any element disclosed in one embodiment may be incorporated or utilized with any other embodiment disclosed herein.

The invention claimed is:
1. A golf course previewing system comprising:
a vehicle comprising:
    a camera configured to generate image data corresponding to an environment surrounding the vehicle as the vehicle drives about a golf course along a ground surface of the golf course; and
    a telemetry sensor configured to facilitate acquiring telemetry data associated with the vehicle; and
one or more processing circuits configured to:
    acquire the telemetry data and the image data;
    assign a location to the image data based on the telemetry data, the location corresponding to a position of the vehicle when the camera generated the image data;

provide the image data and the location to an image database to include the image data in the image database with the location assigned to the image data;
    receive, from a user device, an image request associated with a first location on the golf course;
    acquire, from the image database, first image data corresponding to the first location, the first image data generated by at least one of the camera of the vehicle or another camera of another vehicle as the other vehicle drove about the golf course along the ground surface of the golf course; and
    generate and provide, to the user device, a display interface corresponding to the first image data.
2. The golf course previewing system of claim 1, wherein the one or more processing circuits are configured to:
    determine if the image database includes previous image data associated with the location;
    responsive to the image database including the previous image data associated with the location, assign the image data an image score, the image score corresponding to a quality of the image data; and
    responsive to the image score being higher than a previous image score associated with the previous image data, provide the image data to the image database to replace the previous image data included in the image database.
3. The golf course previewing system of claim 2, wherein the image score corresponds to at least one of a clarity associated with the image data or a recency associated with the image data.
4. The golf course previewing system of claim 1, wherein:
the one or more processing circuits are configured to determine site attribute data corresponding to the first location on the golf course; and
the display interface includes an element corresponding to the site attribute data.
5. The golf course previewing system of claim 4, wherein:
the one or more processing circuits are configured to determine, based on the site attribute data, a distance between the first location and a hole of the golf course; and
the display interface includes an element corresponding to the distance between the first location and the hole on the golf course.
6. The golf course previewing system of claim 4, wherein:
the vehicle includes a topography sensor configured to acquire topography data as the vehicle drives about the golf course;
the one or more processing circuits are configured to acquire the topography data from the vehicle, wherein the site attribute data includes the topography data; and
the display interface provides the element based on the topography data associated with the first location.
7. The golf course previewing system of claim 1, wherein:
the display interface includes one or more actionable items, each of the one or more actionable items associated with moving from the first location to a another location on the ground surface of the golf course; and
in response to receiving a selection of one of the one or more actionable items from the user device, the one or more processing circuits are configured to:
    determine, based on the one of the one or more actionable items, a second location on the ground surface of the golf course associated with the one of the one or more actionable items;

acquire, from the image database, second image data corresponding to the second location; and generate and provide, to the user device, an updated display interface corresponding to the second image data.

8. The golf course previewing system of claim 1, wherein the vehicle is a mower or a golf vehicle.

9. The golf course previewing system of claim 1, wherein the user device is a golf simulator.

10. The golf course previewing system of claim 1, wherein the user device is a display installed in a golf cart.

11. The golf course previewing system of claim 1, wherein the user device is a personal computing device.

12. A golf course preview system comprising:

an image database; and one or more processing circuits configured to:

receive, from a user device, an image request associated with a first location on a golf course;

acquire, from the image database, first image data corresponding to the first location, the first image data depicting a portion of the golf course from a perspective of a golfer positioned at the first location on a ground surface of the golf course, the first image data generated by a vehicle as the vehicle drove about the golf course along the ground surface of the golf course; and generate and provide, to the user device, a display interface corresponding to the first image data.

13. The golf course preview system of claim 12, wherein:

the display interface includes one or more actionable items, each of the one or more actionable items associated with moving from the first location to a another location on the ground surface of the golf course; and in response to receiving a selection of one of the one or more actionable items from the user device, the one or more processing circuits are configured to:

determine, based on the one of the one or more actionable items, a second location on the ground surface of the golf course associated with the one of the one or more actionable items;

acquire, from the image database, second image data corresponding to the second location; and generate and provide, to the user device, an updated display interface corresponding to the second image data.

14. The golf course preview system of claim 12, wherein:

the one or more processing circuits are configured to determine site attribute data corresponding to the first location on the golf course, the site attribute data including at least one of weather conditions associated with the golf course or a hole position of a hole of the golf course; and the display interface includes an element corresponding to the site attribute data.

15. The golf course preview system of claim 14, wherein:

the one or more processing circuits are configured to determine, based on the site attribute data, a distance between the first location and a hole of the golf course; and the display interface includes a distance element corresponding to the distance between the first location and the hole on the golf course.

16. The golf course preview system of claim 14, wherein:

the one or more processing circuits are configured to determine, based on the site attribute data, an altitude difference between the ground surface at the first location and a hole of the golf course; and the display interface includes an altitude element corresponding to the altitude difference between the ground surface at the first location and the hole on the golf course.

17. A method for operating a golf course preview system, the method comprising:

acquiring, from a vehicle, image data generated by the vehicle as the vehicle drives about a golf course along a ground surface of the golf course and telemetry data associated with the vehicle;

assigning a location to the image data based on the telemetry data, the location corresponding to a position of the vehicle when the vehicle generated the image data;

providing the image data and the location to an image database to include the image data in the image database with the location assigned to the image;

receiving, from a user device, an image request associated with a first location on the golf course;

acquiring, from the image database, first image data corresponding to the first location, the first image data generated by at least the vehicle or another vehicle as the other vehicle drove about the golf course along the ground surface of the golf course; and generating and providing, to the user device, a display interface corresponding to the first image data.

18. The method of claim 17, wherein prior to providing the image data to the image database, the method comprises:

determining if the image database includes previous image data associated with the location;

responsive to the image database including the previous image data associated with the location, assigning the image data an image score, the image score corresponding to a quality of the image data; and responsive to the image score being higher than a previous image score associated with the previous image data, providing the image data to the image database to replace the previous image data included in the image database.

19. The method of claim 18, wherein the image score corresponds to at least one of a clarity associated with the image data or a recency associated with the image data.

20. The method of claim 17, further comprising determining site attribute data corresponding to the first location on the golf course, wherein the display interface includes an element corresponding to the site attribute data.

* * * * *